(12) United States Patent
Mattfeld et al.

(10) Patent No.: US 12,151,523 B2
(45) Date of Patent: Nov. 26, 2024

(54) VALVE FOR AN INFLATABLE HOSE SECTION

(71) Applicant: BASF SE, Ludwigshafen (DE)

(72) Inventors: Sascha Mattfeld, Brockum (DE); Günter Scholz, Lemfoerde (DE); Guido Bilges, Stemwede-Oppendorf (DE); Hendrik Kohake, Lohne (DE)

(73) Assignee: BASF SE, Ludwigshafen (DE)

( * ) Notice: Subject to any disclaimer, the term of this patent is extended or adjusted under 35 U.S.C. 154(b) by 705 days.

(21) Appl. No.: 14/406,833

(22) PCT Filed: Jun. 17, 2013

(86) PCT No.: PCT/EP2013/062528
§ 371 (c)(1),
(2) Date: Dec. 10, 2014

(87) PCT Pub. No.: WO2013/189890
PCT Pub. Date: Dec. 27, 2013

(65) Prior Publication Data
US 2015/0183283 A1     Jul. 2, 2015

(30) Foreign Application Priority Data

Jun. 18, 2012  (EP) ..................... 12172320

(51) Int. Cl.
*B60C 29/00*    (2006.01)
*B29D 23/24*    (2006.01)
(Continued)

(52) U.S. Cl.
CPC ............ *B60C 29/005* (2013.01); *B29D 23/24* (2013.01); *B60C 29/04* (2013.01);
(Continued)

(58) Field of Classification Search
CPC ........... B60C 29/04; B60C 29/06; B60C 5/00; B60C 29/005; B60C 23/0494; B60C 5/04;
(Continued)

(56) References Cited

U.S. PATENT DOCUMENTS 2,823,724 A * 2/1958 Gill .................... B60C 29/02
                                                      152/427
4,324,280 A * 4/1982 Kubota ............... B60C 5/04
                                                      152/195
(Continued)

FOREIGN PATENT DOCUMENTS

CN       1961769 A       5/2007
CN       100423663      10/2008
(Continued)

OTHER PUBLICATIONS

Alligator_DE3624503 (Machine Translation) Published Apr. 23, 1987.*
(Continued)

*Primary Examiner* — James C Yager
(74) *Attorney, Agent, or Firm* — Grüneberg and Myers PLLC

(57) ABSTRACT

Valve for an inflatable flexible tube section comprising a tubular shaft, and also a valve base, connected adhesively and around the entire periphery to an end of the shaft, wherein the valve base has been manufactured from a thermoplastic polyurethane.

11 Claims, 1 Drawing Sheet

(51) Int. Cl.
*B60C 29/04* (2006.01)
*B29K 75/00* (2006.01)
*B29K 705/00* (2006.01)

(52) U.S. Cl.
CPC ...... *B29K 2075/00* (2013.01); *B29K 2705/00* (2013.01); *Y10T 137/3584* (2015.04); *Y10T 428/1352* (2015.01)

(58) Field of Classification Search
CPC ................ B60C 29/00; B60C 23/0496; Y10T 137/3584; Y10T 152/10495; Y10T 152/10702; Y10T 29/49826; Y10T 29/49945; Y10T 428/139; Y10T 137/3786; Y10T 29/4941; Y10T 29/4994; Y10T 428/1352; B29D 23/24; B29K 2075/00; B29K 2705/00; B29K 2221/003
USPC ............... 152/429, 511, 427, 431, 450, 415; 137/223, 234.5; 156/120; 425/53; 251/356, 368; 428/34.1
See application file for complete search history.

(56) References Cited

U.S. PATENT DOCUMENTS

| | | | |
|---|---|---|---|
| 5,630,891 | A | 5/1997 | Peterson et al. |
| 5,679,184 | A | 10/1997 | Hosking |
| 2003/0187500 | A1 | 10/2003 | Jansen et al. |
| 2005/0046182 | A1 | 3/2005 | Trapp et al. |
| 2007/0106047 | A1* | 5/2007 | Malz .................. C08G 18/4072 528/44 |
| 2008/0139774 | A1* | 6/2008 | Lawrey .............. C08G 18/0895 528/44 |
| 2009/0281252 | A1* | 11/2009 | Bae ..................... C08L 67/025 525/452 |

FOREIGN PATENT DOCUMENTS

| | | |
|---|---|---|
| CN | 201539610 U | 8/2010 |
| DE | 36 24 503 | 4/1987 |
| DE | 100 50 099 | 4/2002 |
| DE | 10 2009 007 163 | 8/2010 |
| EP | 0 090 221 | 10/1983 |
| EP | 0 922 552 | 6/1999 |
| EP | 1 826 225 | 8/2007 |
| EP | 1 846 465 | 10/2007 |
| JP | 54-122507 A | 9/1979 |
| JP | 58-174001 A | 10/1983 |
| JP | 8-82375 A | 3/1996 |
| JP | 2005-172114 A | 6/2005 |
| WO | 96 18513 | 6/1996 |
| WO | WO 00/77429 A1 | 12/2000 |
| WO | 2006 082183 | 8/2006 |
| WO | 2007 118827 | 10/2007 |
| WO | 2010 076224 | 7/2010 |

OTHER PUBLICATIONS

"Benutzerhinweise Ergon BH200 und BH300 Trinksystem", Ergon International RTI Sports GmbH, Urmitz, (Jan. 22, 2010) XP002713049.
Guenter Oertel., "Polyurethane Handbook", $2^{nd}$ Edition, Hanser Publisher, Munich, pp. 421-433, (Aug. 19, 1994).
Guenter Oertel., "Polyurethane Handbook", $2^{nd}$ Edition, Hanser Publisher, Munich, pp. 388-421, (Aug. 19, 1994).
Hans Zweifel., "Plastics Additives Handbook", $5^{th}$ Edition, Hanser Publisher, Muenchen, 2001 ([1]), pp. 98-136.
International Search Report Issued Oct. 2, 2013 in PCT/EP13/062528 Filed Jun. 17, 2013.
Combined Chinese Office Action and Search Report issued May 27, 2016 in Patent Application No. 201380032369.4 (with English translation of categories of cited documents).

* cited by examiner

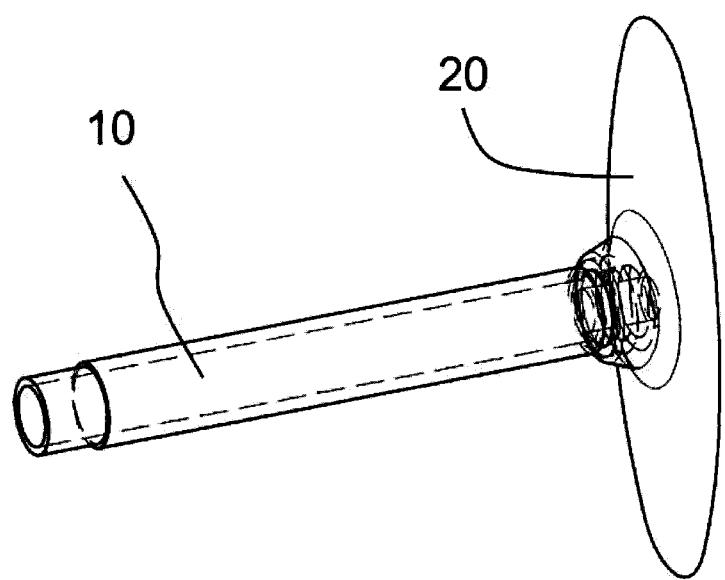

VALVE FOR AN INFLATABLE HOSE SECTION

This application is a National Stage of PCT/EP2013/062528, which was filed on Jun. 17, 2013. This application is based upon and claims the benefit of priority to European application Ser. No. 12/172,320.9, which was filed on Jun. 18, 2012.

The present invention relates to a valve for an inflatable flexible tube section comprising a tubular shaft, and also a valve base, connected adhesively and around the entire periphery to an end of the shaft. The invention further relates to an inflatable flexible tube section manufactured from a thermoplastic polyurethane and connected to a valve of the invention. The invention further comprises processes for producing the valve and its connection to the flexible tube section.

Flexible tubes for tires, for example bicycle tires, are usually manufactured mainly from rubber. There are also known flexible tubes produced from thermoplastics, for example from thermoplastic polyurethane. A feature of the latter is that they can withstand higher loads than flexible tubes that use mainly rubber, and have markedly lower weight. However, when compared with flexible tubes using mainly rubber they are currently still considerably more expensive to produce.

Laid-open specification DE 10 2009 007 163 A1 describes a flexible tube system with a flexible tube shaped to give a ring, and also with a valve inserted into an aperture in the flexible tube. There is a connection between flexible tube and valve in that the flexible tube wall surrounding the aperture has been clamped between the end of the valve and a pressure sleeve arranged on the valve.

Pneumatic tires are known to use not only flexible tubes shaped as a torus but also flexible tube sections sealed at both ends: the document EP 0 090 221 A1 discloses a flexible tube section made of a thermoplastic elastomer which can be used instead of a conventional flexible tube in a tire. To secure the valve to the flexible tube section, it is proposed that the valve shaft be inserted from inside through an aperture in the flexible tube wall and that it be adhesive-bonded by means of a solvent. As an alternative, the valve can be secured on the flexible tube wall without adhesive bonding with the aid of two rubber washers and a screw-threaded nut.

Laid-open specification DE 36 24 503 A1 describes another way of securing a valve on a flexible tube section. The valve comprises a shaft and a baseplate, manufactured from a rubber-like plastic. The shaft is composed of a plastic which is markedly harder than the material of the base, and has been connected to the base by a molecular method. The base can be manufactured during the production of the flexible tube and can have integral connection thereto.

In all of the known flexible tubes, the process of securing the valve on the flexible tube wall is complicated and susceptible to disruption, for example with respect to the possibility of unintended extraction of the valve in the case of the clamped variants.

An object was to provide a valve which is intended for a flexible tube section and which can be secured simply and reliably on a flexible tube section. Another object was to provide a flexible tube section with a corresponding valve.

Said object is achieved through the subject matter of the invention, as given in claim 1. Other subject matter of the invention is given in claim 7. Claims 8, 9, and 12 give processes for producing the articles of the invention. The respective dependent claims provide other advantageous embodiments of the invention.

The present invention therefore is directed to a valve for an inflatable flexible tube section comprising a tubular shaft, and also a valve base, connected adhesively and around the entire periphery to an end of the shaft, wherein the valve base has been manufactured from a thermoplastic polyurethane.

The present invention is also directed to an inflatable flexible tube section manufactured from a thermoplastic polyurethane, which has an aperture and has been connected adhesively around this aperture and around the entire periphery to the valve base of a valve according to any of embodiments 1 to 6, in such a way that the connection between the internal space of the flexible tube and the internal space of the shaft has been sealed off from the environment.

The valve of the invention is suitable for attachment on an inflatable flexible tube section. Said flexible tube section can involve a closed annular flexible tube or a tube section sealed at both ends. In the invention, the valve comprises a tubular shaft, and also a valve base manufactured from a thermoplastic polyurethane. The valve base has been connected adhesively and around the entire periphery to an end of the shaft.

The expression "around the entire periphery" here means that the valve base completely embraces, with no gaps, an end of the shaft over its entire periphery. An "adhesive connection" means that a connection is produced between the components by virtue of physical and/or chemical interactions between the surface of the shaft and the material of the valve base, and is more than merely an interlock.

The valve of the invention is suitable for flexible tubes or flexible tube sections filled with a gas, in particular air, for example those known from bicycles, handcarts, motorized vehicles, or trailers. The dimensions of valve shaft and valve inserts preferably correspond to those of known valves, for example in respect of the length and the diameter of the shaft.

In one embodiment of the invention, the shaft has been manufactured from a metallic material, in particular from iron, steel, brass, or aluminum. The shaft can also have been produced from a plurality of different materials, for example from a lower portion made of brass and from an upper portion made of aluminum, where the two parts have been connected securely to one another. In this context, "lower portion" means the shaft portion which in the installed condition faces toward the flexible tube, whereas the "upper portion" faces away from the flexible tube.

In one preferred embodiment, the shaft has been manufactured from aluminum, and at least the shaft section connected to the valve base has been anodized on the exterior peripheral surface thereof. The electrolytic oxidation of aluminum components is known, and is usually carried out for corrosion-protection reasons. During the anodization process, the components are often also colored, for example in order to identify the anodized parts or for reasons of design. It has been found that the anodization of the shaft has an advantageous effect on the connection of the shaft to the valve base. Said surface treatment ensures good adhesion of the aluminum to the thermoplastic polyurethane from which the valve base has been produced.

In another preferred embodiment, at least the shaft section connected to the valve base is plasma-treated, in order to improve adhesion to the valve base.

In another preferred embodiment, the shaft has been manufactured from a thermoplastic. The mostly cylindrical or sectionally cylindrical shape of the shaft can by way of example be produced by injection molding or extrusion. The internal and/or external screw threads usually required for attachment of the other valve components can be produced before the end of the production process or subsequently, e.g. through known methods of turning or of threading.

The toughness and ductility of the thermoplastic used for producing the shaft preferably ensure that the shaft does not fracture at low temperatures. Examples of suitable thermoplastics are tough grades, or grades modified for toughness, from the groups of styrenics, styrene copolymers, polyamides, polyesters, polyethers, such as polyoxymethylene, polyolefins, and polyurethanes. Particular preference is given to a thermoplastic suitable for temperatures down to minus 30° C. A feature of a shaft produced from a thermoplastic, when compared with an aluminum shaft, is markedly less energy cost incurred for the production process and a shorter manufacturing time.

Thermoplastic polyurethane (TPU) is a particularly preferred material, and, in the hardened state, has the strength needed for the use as valve shaft and elasticity which allows the shaft to be bent without fracturing. A valve of this type provides advantages in relation to a wide variety of design variants, and also in terms of accessibility and operation, e.g. when a tire is inflated by pumping.

Suitable thermoplastic polyurethanes are for example based on polyesters or polyethers.

According to one embodiment, the thermoplastic polyurethane has a shore hardness preferably in the range of from 70 A to 95 D, more preferable in the range of from 90 A to 90 D an in particular in the range of from 98 A to 85 D.

According to a further embodiment of the present invention, the thermoplastic polyurethane preferably has a low hardness and the shaft of the valve is flexible. This improves the accessibility of the valve for certain applications.

Thermoplastic polyurethanes are well known. The production process reacts (a) isocyanates with (b) compounds reactive toward isocyanates and having a number-average molar mass of from $0.5 \times 10^3$ g/mol to $100 \times 10^3$ g/mol, and optionally with (c) chain extenders with molar mass from $0.05 \times 10^3$ g/mol to $0.499 \times 10^3$ g/mol, optionally in the presence of (d) catalysts and/or of (e) conventional auxiliaries and/or additives.

The components (a) isocyanate, (b) compounds reactive toward isocyanates, and (c) chain extenders are also individually or jointly termed structural components.

Organic isocyanates (a) used preferably comprise aliphatic, cycloaliphatic, araliphatic, and/or aromatic isocyanates, more preferably tri-, tetra-, penta-, hexa-, hepta-, and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis (isocyanatomethyl)cyclohexane (HXDI), cyclohexane 1,4-diisocyanate, 1-methylcyclohexane 2,4- and/or 2,6-diisocyanate, and/or dicyclohexylmethane 4,4'-, 2,4'- and 2,2'-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate and/or phenylene diisocyanate. Further suitable isocyanates are for example hexamethylene diisocyanate (HDI) or 1-isocyanato-4-[(4-isocyanatohexyl) methyl]cyclohexane (H12MDI). It is particularly preferable to use 4,4'-MDI.

Compounds (b) that are used and that are reactive toward isocyanates are preferably polyesterols or polyetherols, usually also referred to collectively by the term "polyols". The number-average molar masses of said polyols are from $0.5 \times 10^3$ g/mol to $8 \times 10^3$ g/mol, preferably from $0.6 \times 10^3$ g/mol to $5 \times 10^3$ g/mol, in particular from $0.8 \times 10^3$ g/mol to $3 \times 10^3$ g/mol. The average functionality of the polyols is preferably from 1.8 to 2.3, preferably from 1.9 to 2.2, in particular 2. It is preferable for the polyols (b) to have only primary hydroxy groups. The average molar mass is determined according to DIN 55672-1.

Chain extenders (c) that can be used preferably comprise aliphatic, araliphatic, aromatic, and/or cycloaliphatic compounds with molar mass of from 0.05 kg/mol to 0.499 kg/mol, preferably difunctional compounds, for example diamines and/or alkanediols having from 2 to 10 carbon atoms in the alkylene moiety, in particular 1,4-butanediol, 1,6-hexanediol, and/or di-, tri-, tetra-, penta-, hexa-, hepta-, octa-, nona-, and/or decaalkylene glycols having from 3 to 8 carbon atoms, and preferably corresponding oligo- and/or polypropylene glycols, and it is also possible here to use a mixture of the chain extenders. It is preferable for the compounds (c) to have only primary hydroxy groups.

In one preferred embodiment, catalysts (d) which in particular accelerate the reaction between the NCO groups of the diisocyanates (a) and the hydroxy groups of the compound (b) reactive toward isocyanates and the chain extender (c) are tertiary amines, in particular triethylamine, dimethylcyclohexylamine, N-methylmorpholine, N,N'-dimethylpiperazine, 2-(dimethylaminoethoxy)ethanol, or diazabicyclo(2,2,2)octane. In another preferred embodiment, these are organometallic compounds, such as titanic esters, iron compounds, preferably iron(III) acetylacetonate, tin compounds, preferably tin diacetate, tin dioctoate, tin dilaurate, or the dialkyltin salts of aliphatic carboxylic acids, preferably dibutyltin diacetate or dibutyltin dilaurate. The amounts preferably used of the catalysts (d) are from 0.0001 to 0.1 part by weight per 100 parts by weight of the compound (b) reactive toward isocyanates. It is preferable to use tin catalysts, in particular tin dioctoate.

It is also possible to add conventional auxiliaries (e), alongside catalysts (d), to structural components (a) to (c). Mention may be made for example of surfactant substances, fillers, flame retardants, nucleating agents, oxidation stabilizers, lubricants and mold-release aids, dyes, and pigments, and optionally other stabilizers, e.g. with respect to hydrolysis, light, heat, or discoloration, inorganic and/or organic fillers, reinforcing agents, and plasticizers. Preferred hydrolysis stabilizers used are oligomers and/or polymeric aliphatic or aromatic carbodiimides. It is preferable to protect the TPU of the invention from aging by adding stabilizers thereto. For the purposes of the present invention, stabilizers are additives which protect a plastic or a plastics mixture from detrimental environmental effects. Examples are primary and secondary antioxidants, hindered amine light stabilizers, UV absorbers, hydrolysis stabilizers, quenchers, and flame retardants. Examples of commercial stabilizers are given in Plastics Additive Handbook, 5th edition, H. Zweifel, ed., Hanser Publishers, Munich, 2001 ([1]), pp. 98-136.

In principle, any thermoplastic polyurethane is suitable for producing the valve shaft. Hardness is adjusted by using structural components (a) to (c), and the level of hardness is determined here by the ratio (a)+(c):(b). The melt index of the TPUs can be varied by using a relatively wide range of molar ratios in the amounts used of structural components (b) and (c), where increasing content of chain extender (c)

causes the melt viscosity to rise, while the melt index falls. The Shore hardness of corresponding TPUs is from 30 A to 100 D, preferably from 50 A to 80 D, and particularly preferably from 60 A to 75 D.

Other general information on the production of thermoplastic polyurethanes can be found inter alia in the following standard text: Polyurethane Handbook, edited by Günter Oertel, 2nd edition, Hanser Publisher, Munich, pp. 421-433. Specific processes for TPUs with low to high crystallinity can be found in EP 0 922 552 A1 and, for transparent appearance, in EP 1 846 465 A1. Particularly transparent TPUs can be found by way of example in WO 2010/076224 A1 and WO 2007/118827 A1, the content of which is hereby incorporated into this application.

A valve shaft can be produced from thermoplastic polyurethane by way of example by injection molding, extrusion and/or sintering processes. Preference is given to production by means of injection-molding or extrusion processes. According to the present invention it is possible that a thread is cut in the shaft of the valve after preparation in order to fix a cap. It is also possible that the thread is generated in the preparation process, for example in the preparation process of the shaft via injection molding.

Therefore, the present invention is also directed to a process for the preparation of a valve as disclosed above wherein the shaft is placed in a mold and the valve base is prepared while casting around the shaft in the mold.

In preferred embodiments of the invention, the valve base encloses the shaft in an axial direction to an extent of at least 3 mm, particularly preferably at least 5 mm. For further improvement of the connection between valve base and shaft it is preferable that, in the shaft section connected to the valve base, there is a groove extending inward from the exterior cylindrical surface. Once the valve base has been applied on the shaft, the material of the valve base has filled said groove, thus providing an additional interlock between valve base and shaft. The depth of the groove, measured inward from the cylindrical surface, and the shape thereof, are preferably selected in such a way that on the one hand the material of the valve base completely fills the groove and on the other hand the thickness of the material of the valve base at the groove retains sufficient strength. A depth of from 0.1 to 0.7 mm, in particular from 0.3 to 0.5 mm, has proven to be a good compromise between these requirements.

In preferred embodiments of the invention, the dimensioning of the valve base is moreover such that the extent to which the valve base protrudes beyond the exterior edge of the shaft in each radial direction at the end of the shaft corresponds at least to half of the diameter of the shaft at its lower end. It is particularly preferable that the extent to which the valve base protrudes beyond the exterior edge of the shaft in each radial direction at the end of the shaft corresponds at least to the diameter of the shaft at its lower end. By way of example, if the diameter of the shaft at its lower end is 5 mm, the extent to which the valve base protrudes beyond the exterior edge of the shaft in each radial direction at the end of the shaft is preferably 2.5 mm, particularly preferably at least 5 mm. The external diameter of the valve base in this example is therefore preferably at least 10 mm, particularly preferably at least 15 mm.

The expressions "axial direction" and "radial direction" refer to the axis of the shaft, which is usually cylindrical. The minimum dimensions axially and in a radial direction ensure that once the shaft has been secured on a flexible tube section the shaft has a secure connection to the flexible tube section and there are no resultant leaks through which, for example, air could escape from the interior of the flexible tube into the environment.

The valve-base contact area provided for securing on a flexible tube section can have various shapes. In one embodiment it is circular, and the valve base therefore projects to an identical extent in each radial direction beyond the exterior edge of the shaft at its lower end. In another embodiment, the contact area is oval, and the above minimum dimensions for the extent of projection here relate to the transverse axis. The transverse axis is the term used for the shorter axis of the oval, the longer axis being termed longitudinal axis. The longitudinal-axis dimension of the contact area of the valve base is preferably from 1.5 to 3 times the transverse-axis dimension thereof.

In a preferred method of securing a valve base with an oval contact area on a flexible tube section, the direction of the longitudinal axis is the same as the longitudinal direction of the flexible tube section. The longitudinal direction of the flexible tube section corresponds to the direction of running of the tire in which the flexible tube section can be used.

It has moreover proven advantageous to select, as material for producing the valve base, a thermoplastic polyurethane of which the mechanical properties, such as elasticity and elongation, correspond to those of the flexible tube material. It is particularly advantageous that the material used to produce the valve base and to produce the flexible tube section on which the valve base is to be secured are the same. By selecting an appropriate material it is possible to achieve a marked reduction in the probability that different properties of materials produce stress cracking or separation phenomena during pumping for inflation or as a result of loadings during operation of the flexible tube section.

The starting materials and production processes for the valve base made of thermoplastic polyurethane correspond to the materials described above for producing a valve shaft from thermoplastic polyurethane.

For the valve base it is preferable to use a thermoplastic polyurethane with Shore hardness of from 40 A to 70 D, preferably from 50 A to 50 D, more preferably from 70 A to 90 A. The processing of TPU advantageously uses lubricants, alongside the additives mentioned. These come from the following groups of substances: fatty acid amides, montanic esters, glycerol derivatives, polyolefins, and combinations thereof. The individual compounds can be found in EP 1 826 225 A2 and in the literature cited therein. The content of processing aids has to be minimized in the process of the invention in order to ensure maximum adhesion of the valve shaft to the bicycle inner tube. The proportion of lubricant, based on the entire formulation, is to be from 0.001 to 2% by weight, preferably from 0.01 to 1% by weight, and particularly preferably from 0.05 to 0.5% by weight.

A preferred process for producing a valve of the invention comprises inserting the shaft into a mold and producing the valve base in the mold during the process of molding around the shaft. In the case of a shaft made of a metallic material, it is preferable to pretreat at least the shaft section intended for connection to the valve base, in particular by using plasma treatment or by anodization when the material comprises aluminum. In the case of a shaft made of thermoplastic polyurethane, there is very seldom any need for pretreatment, since the material from which the valve base is produced provides a good adhesive connection to the shaft material.

In one preferred embodiment of the process, the valve base is produced under pressure in an injection-molding process. The shaft is inserted into the mold, the mold is closed, and the thermoplastic polyurethane in the form of melt is injected onto a lower section of the shaft. Once the plastics composition has hardened, the finished valve is removed in the form of composite component from the mold. The polyurethane melt is preferably processed at a temperature of from 150° C. to 250° C. and at a mold pressure of from 100 to 400 bar.

In another embodiment of the process, the valve base is produced at ambient pressure by using, instead of a melt, a molding system based on polyurethanes. The molding system can be composed of one or more, in particular two, components. This production variant is less expensive than the melt process, but production cycle times are longer.

The starting materials for molding systems are in essence the same as those described above for the thermoplastic polyurethanes. Materials mostly used are also polyols having more than 2 hydroxy groups, and/or crosslinking agents, thus producing crosslinked polyurethanes with high mechanical strength. Preferred crosslinking agents are short-chain glycols or diamines, which are preferably metered separately, in particular in the case of hot molding systems. Further information on molding systems and corresponding production processes can be found inter alia in the following standard text: Polyurethane Handbook, edited by Gunter Oertel, 2nd edition, Hanser Publisher, Munich, pp. 388-421.

The invention further provides an inflatable flexible tube section which has been manufactured from a thermoplastic polyurethane and which has an aperture through which air can be passed into the flexible tube. Around said aperture, the flexible tube section has been connected adhesively and around the entire periphery to the valve base of a valve of the invention, in such a way that there is a leakproof connection between the internal space of the flexible tube and the internal space of the shaft. Suitable materials for producing the flexible tube section are known, as also are processes for producing same, for example extrusion, injection molding, or blow molding.

In the context of the present invention, the material of the flexible tube section can have the same composition as the material of the valve. It is also possible that the flexible tube section and the valve have a different composition or consist of different materials.

In the context of the present invention, preferably the flexible tube section and the valve consist of a thermoplastic polyurethane, wherein generally the hardness of the thermoplastic polyurethane used for the flexible tube section and the valve is not identical.

There are various ways of producing a durable connection between the valve base and the flexible tube section surface surrounding the aperture. Examples of materials suitable for this purpose are known adhesives, in particular adhesives based on polyurethane.

A preferred method for connecting the valve to the flexible tube section comprises wetting the underside of the valve base with a solvent and then forcing the underside of the valve base onto the surface of the flexible tube section. This process, in which adhesive interlock bonding takes place once the sulfated surface of the valve base has been pressed onto the flexible tube surface, is also termed "solvent welding". It is particularly preferred that the solvent is selected from the group of the ethers, cyclic ethers, amines, amides, alcohols, and halogenated hydrocarbons. In particular, the solvent comprises methanol, ethanol, isopropanol, dimethylformamide, N-methylpyrrolidone, and/or tetrahydrofuran. Preference is equally given to mixtures of the substances mentioned.

Therefore, the present invention is also directed to a process for producing a flexible tube section as disclosed above, which comprises wetting the underside of the valve base with a solvent and then forcing the underside of the valve base onto the surface of the flexible tube section.

There is another preferred variant in which the connection between valve base and flexible tube section is produced by means of a welding process. Thermal welding, high-frequency welding, or ultrasound welding processes are particularly suitable.

Therefore, the present invention is also directed to a process for producing a flexible tube section as disclosed above, which comprises connecting the valve base to the flexible tube section by means of a welding process, in particular by means of thermal welding, high-frequency welding, or ultrasound welding.

In the context of the present invention it is possible that a hole is generated in the flexible tube section which allows for inflating the flexible tube which is obtained, and subsequently the valve or the shaft of the valve respectively is connected flush with the hole. It is also possible that the valve is connected with the flexible tube section first and the hole is subsequently generated through the shaft of the valve.

The valve of the invention can be produced simply and at low cost, as also can flexible tube sections equipped therewith. The connections between valve shaft and valve base on the one hand and between valve and flexible tube section on the other hand are robust and secure, and the subject matter of the invention is therefore suitable for a wide range of possible uses.

The valve according to the present invention or the inflatable flexible tube section respectively are for example suitable for the preparation of inner tubes, in particular for the preparation of inner tubes for bikes.

In the following, embodiments of the present invention are exemplary disclosed and do not restrict the present invention. The present invention includes the following embodiments, wherein these include the specific combinations of embodiments as indicated by the respective inter-dependencies defined therein.

1. A valve for an inflatable flexible tube section comprising a tubular shaft, and also a valve base, connected adhesively and around the entire periphery to an end of the shaft, wherein the valve base has been manufactured from a thermoplastic polyurethane.
2. The valve according to embodiment 1, in which the shaft has been manufactured from a thermoplastic, in particular from a thermoplastic polyurethane.
3. The valve according to embodiment 1, in which the shaft has been manufactured from a metallic material, in particular from iron, steel, or aluminum.
4. The valve according to embodiment 1, in which the shaft has been manufactured from aluminum, where at least the shaft section connected to the valve base has been anodized on the exterior peripheral surface thereof.
5. The valve according to any of embodiments 1 to 4, where the valve base encloses the shaft in an axial direction to an extent of at least 3 mm.
6. The valve according to any of embodiments 1 to 5, where the extent to which the valve base protrudes beyond the exterior edge of the shaft in each radial direction at the end of the shaft corresponds at least to half of the diameter of the shaft at its lower end.
7. An inflatable flexible tube section manufactured from a thermoplastic polyurethane, which has an aperture and has been connected adhesively around this aperture and around the entire periphery to the valve base of a valve according to any of embodiments 1 to 6, in such a way that the connection between the internal space of the flexible tube and the internal space of the shaft has been sealed off from the environment.

8. A process for producing a valve according to any of embodiments 1 to 6, which comprises inserting the shaft into a mold and producing the valve base in the mold during the process of molding around the shaft.
9. A process for producing a flexible tube section according to embodiment 7, which comprises wetting the underside of the valve base with a solvent and then forcing the underside of the valve base onto the surface of the flexible tube section.
10. The process according to embodiment 9, where the solvent has been selected from the group of the ethers, cyclic ethers, amines, amides, alcohols, and halogenated hydrocarbons.
11. The process according to embodiment 10, where the solvent comprises methanol, ethanol, isopropanol, dimethylformamide, N-methylpyrrolidone, and/or tetrahydrofuran.
12. A process for producing a flexible tube section according to embodiment 7, which comprises connecting the valve base to the flexible tube section by means of a welding process, in particular by means of thermal welding, high-frequency welding, or ultrasound welding.

Examples are used below for further explanation of the invention. Neither the examples nor FIG. 1, which is to be considered as a depiction of the principle, represent(s) any restriction of the invention, for example in respect of specific dimensions or design variants of components. FIG. 1 is a diagram of a valve of the invention, comprising a shaft 10 and a valve base 20.

EXAMPLES

The trials used commercially available valve shafts of Sclaverand type with total length 58 mm and external diameter 6 mm. The diameter of the shaft section intended for securing the valve base was greater, 7 mm, over a length of about 4 mm. In the middle of this region there was a circumferential groove of depth about 0.5 mm with rounded U-shaped longitudinal section.

Comparative Example

A valve shaft with the dimensions described above, made of aluminum, was inserted into an injection mold, the mold was closed, and a thermoplastic polyurethane of Shore hardness 80 A (Elastollan 1180 A 10 from BASF Polyurethanes GmbH, Lemforde) was injected onto the material, to form the valve base. As soon as the melt had solidified, the finished valve was removed from the mold and stored at 80° C. for 15 hours. This gave the material its final strength. In the valve thus produced, the valve base could easily be pulled away from the shaft manually. There was inadequate adhesion. The only factor ensuring a certain stability was the interlock by virtue of the groove. However, air would inevitably escape in the event of loading under pressure, for example after pumping to inflate a bicycle tire, since the interlock does not provide a seal.

Inventive Example 1

Another valve shaft as described in the comparative example was connected to the same thermoplastic polyurethane under the same process conditions. The shaft had been manufactured from aluminum and completely anodized. In this valve, adhesion between the valve base and the shaft was so great that the valve base could not be pulled away from the shaft without resultant damage thereto. The connection between shaft and valve base was durable and airtight.

Inventive Example 2

Another valve shaft as described in both of the trials described above was connected to the same thermoplastic polyurethane under the same process conditions. The shaft had been manufactured from a thermoplastic polyurethane of Shore hardness 75 D. Its length was likewise 58 mm and its external diameter was 6 mm. In contrast to the two aluminum shafts, no enlargement had been applied to the diameter of the section thereof intended for securing to the valve base. At a distance of 4 mm from the lower end thereof, there was a groove of width 1 mm and depth about 0.5 mm, with rectangular longitudinal section. There was very good adhesion between valve base and shaft, as was also the case in inventive example 1. The connection between shaft and valve base was durable and airtight.

In all three cases described above, the valve base was oval, with a dimension of 40 mm along its longitudinal axis and 18 mm along its transverse axis. Its height profile corresponded to that depicted qualitatively in FIG. 1. Starting at the edges, its height then increased slowly, and total height at the shaft was 5 mm. The thickness of the material of the valve base in the section covering the shaft was about 2-0.5 mm, decreasing in the axial direction of the shaft upward away from the base.

Inventive Example 3

An aperture of size the same as the internal diameter of the valve was punched into a commercially available bicycle inner tube made of thermoplastic polyurethane (Firma Eclipse Microsystems GmbH, Ebmatingen, Switzerland). The base of a valve of the invention as in inventive example 1 was immersed for less than one second in liquid tetrahydrofuran as solvent. The valve was then placed centrally onto the aperture in the bicycle inner tube and pressed manually onto the material. After a waiting time of about 15 seconds, there was adhesion between the underside of the valve base and the flexible tube surface. After air drying at room temperature for about 60 seconds, during which the tetrahydrofuran evaporated, the final level of adhesion had been obtained. The connection between the valve and the flexible tube was airtight and secure.

The invention claimed is:
1. A valve for an inflatable flexible tube section comprising a thermoplastic polyurethane, the valve comprising:
a tubular shaft, and
a valve base connected adhesively and around the entire periphery to an end of the tubular shaft,
wherein:
the valve base comprises a thermoplastic polyurethane which is a reaction product of (a) isocyanates with (b) polyetherols as compounds reactive toward isocyanates, the polyetherols having a Mn of $0.5 \times 10^3$ g/mol to $100 \times 10^3$ g/mol, the thermoplastic polyurethane having a shore hardness of from 70 A to 90 A;
the tubular shaft comprises a thermoplastic polyurethane having a shore hardness in the range of from 70 A to 95 D, wherein the valve base of the valve is connected adhesively to the inflatable flexible tube section comprising a thermoplastic polyurethane,
wherein
the inflatable flexible tube section comprises an aperture, and
the inflatable flexible tube section is connected adhesively around the aperture and around the entire periphery to the valve base of the valve, in such a way that the connection between an internal space of the inflatable flexible tube section and an internal space of the tubular shaft is sealed off from the environment.

2. The valve according to claim 1, wherein the valve base encloses the tubular shaft in an axial direction to an extent of at least 3 mm.

3. The valve according to claim 1, wherein the valve base protrudes beyond an exterior edge of the tubular shaft in each radial direction at the end of the tubular shaft to an extent that corresponds at least to half of the diameter of the tubular shaft at its lower end.

4. An inflatable flexible tube section comprising a thermoplastic polyurethane, wherein:
the inflatable flexible tube section comprises an aperture; and
the inflatable flexible tube section is connected adhesively around the aperture and around the entire periphery to the valve base of the valve according to claim 1, in such a way that the connection between the internal space of the flexible tube and the internal space of the shaft is sealed off from the environment.

5. A process for producing a valve according to claim 1, comprising inserting the tubular shaft into a mold and casting around the tubular shaft in the mold to produce the valve base.

6. A process for producing the inflatable flexible tube section according to claim 4, comprising wetting an underside of the valve base with a solvent and then forcing the underside of the valve base onto a surface of the inflatable flexible tube section.

7. The process according to claim 6, wherein the solvent is selected from the group consisting of an ether, a cyclic ether, an amine, an amide, an alcohol and a halogenated hydrocarbon.

8. The process according to claim 7, wherein the solvent comprises at least one selected from the group consisting of methanol, ethanol, isopropanol, dimethylformamide, N-methylpyrrolidone, and tetrahydrofuran.

9. A process for producing the inflatable flexible tube section according to claim 4, comprising connecting the valve base to the inflatable flexible tube section by thermal welding, high-frequency welding, or ultrasound welding.

10. The valve according to claim 1, wherein said the valve base comprises a thermoplastic polyurethane which is a reaction product of (a) isocyanates with (b) polyetherols as compounds reactive toward isocyanates the polyetherols having a Mn of $0.5 \times 10^3$ g/mol to $100 \times 10^3$ g/mol and (c) chain extenders with a molar mass from $0.05 \times 10^3$ g/mol to $0.499 \times 10^3$ g/mol.

11. The valve according to claim 1, wherein said polyetherols have an average functionality of 1.8 to 2.3.

* * * * *